March 3, 1964 B. P. FRANKLIN 3,123,288
FAN GUARD AND MOTOR SUPPORT
Filed Sept. 15, 1961 2 Sheets-Sheet 1

Inventor:
Burton P. Franklin,
by Leonard Platt
His Attorney.

March 3, 1964 B. P. FRANKLIN 3,123,288
FAN GUARD AND MOTOR SUPPORT
Filed Sept. 15, 1961 2 Sheets-Sheet 2
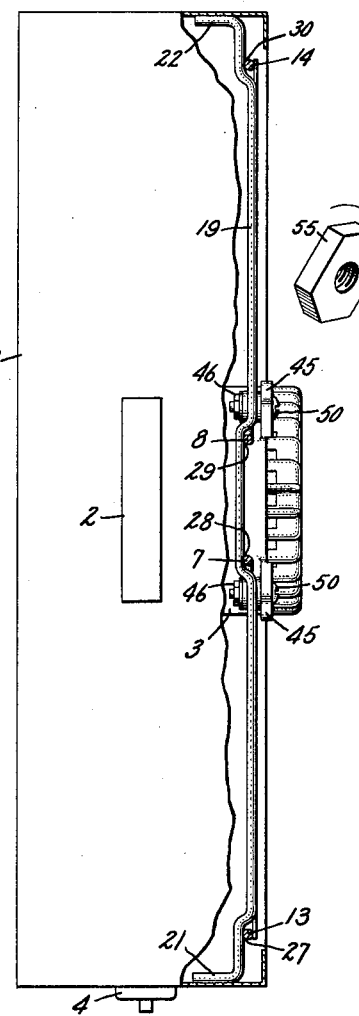
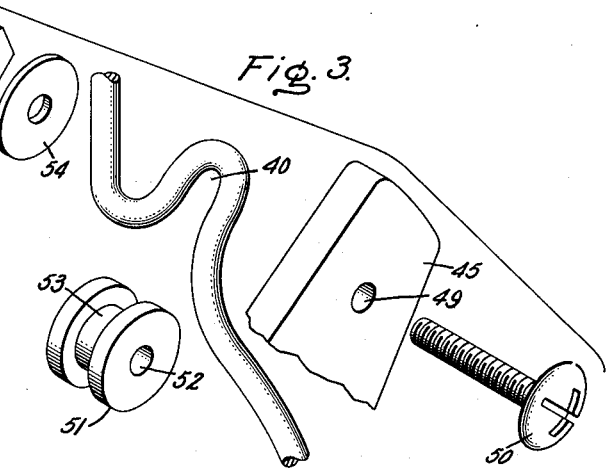
Inventor:
Burton P. Franklin,
by Lenard J. Platt
His Attorney.

United States Patent Office 3,123,288
Patented Mar. 3, 1964

3,123,288
FAN GUARD AND MOTOR SUPPORT
Burton P. Franklin, Danville, Va., assignor to General Electric Company, a corporation of New York
Filed Sept. 15, 1961, Ser. No. 138,308
3 Claims. (Cl. 230—273)

The present invention relates to electric fan constructions and more particularly to a combined fan guard and motor support for an electric fan or the like.

It is desirable in bladed fans that are driven by an electric motor to exclude the introduction of foreign articles or a person's hand into the arcuate path defined by the rapidly moving fan blades. It is also desirable to make certain that the necessary mounting features are provided to adequately support the motor driven fan during its operation. For this reason a combination guard for the fan with a motor support is preferably provided in one unit. This unit should, with a minimum number of structural components, provide the necessary support and protective features, and also dampen any vibrations stemming from the motor driven fan which resonate when transmitted to the casing surrounding the motor driven fan to which the fan guard and motor support is conventionally attached.

Accordingly, it is an object of the present invention to provide an improved fan guard and motor support.

Another object of the present invention is to provide a new and improved fan guard and motor support that has a minimum number of structural components facilitating ease of manufacture.

A further object of the present invention is to provide a new and improved fan guard and motor support which isolates developed vibrations from a motor driven fan.

Briefly stated, in accordance with the present invention, a fan assembly is provided having an improved fan motor support means comprising four members parallel to each other and having their extremities fixed to a casing, while two separate members that are parallel to each other are positioned lateral to the four parallel members and have their extremities fixed to the casing. The two parallel members are fixed to the four parallel members at respective crossing points and define a central region that is adapted to receive resilient fan motor mounting elements in a manner to isolate motor and fan vibrations.

While the specification concludes with claims particularly pointing out and distinctly claiming this subject matter, which may be regarded as the invention, the organization and method of operation, together with further objects and advantages thereof, may best be understood to the following description taken in connection with the accompanying drawings in which:

FIG. 2 is a top view partly broken away to show the fan assembly of FIG. 1 and more clearly shows the improved fan guard and motor support of the present invention; and FIG. 3 is an exploded view of the resilient mount forming a part of the improved fan guard and motor support of the present invention.

Figure 1:
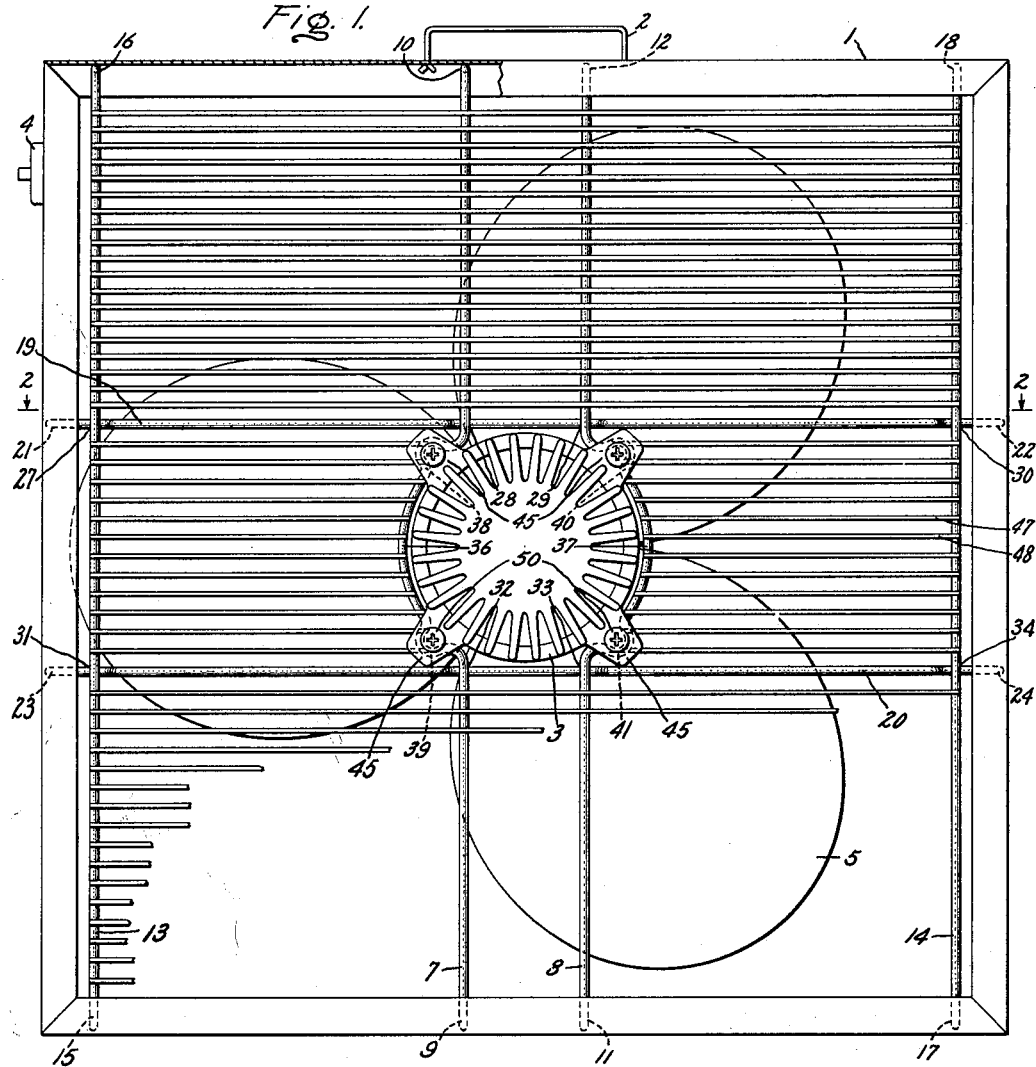
FIG. 1 is a front view of a fan assembly having one form of the improved fan guard and motor support of the present invention.

Referring to the drawings, and particularly to FIG. 1, the fan assembly shown therein comprises a metallic casing 1 that is generally rectangular and has a suitable handle 2 attached to the casing to provide portability for the particular fan assembly embodying one form of the present invention. An electric motor 3 is centrally disposed within the area defined by the fan assembly casing and is controlled by a suitable electric switch 4 which forms no part of the present invention. A bladed fan 5 is driven by the electric motor and in the present form shown is of a three-bladed configuration, although this forms no basis of the present invention but serves merely to illustrate one form of a motor driven fan.

The improved fan guard and motor support of the present invention is shown by FIG. 1 to consist of several related structural components. A first member 7 and a second member 8 are positioned to form an inner pair of members parallel to each other and adjacent to the periphery of the electric motor of the motor driven fan. The extremities 9 and 10 of the first member 7 and the extremities 11 and 12 of the second member 8 are fixed to the casing 1. A third member 13 and a fourth member 14 parallel to each other and parallel to the first member 7 and the second member 8 respectively, but spaced on opposite sides therefrom, have the extremities 15 and 16 of the third member 13 and the extremities 17 and 18 of the fourth member 14 also fixed to the casing 1. These parallel members, that is, the first member 7, the second member 8, the third member 13 and the fourth member 14, are distinguished from two lateral members 19 and 20 parallel to each other and lateral to the four parallel members. The two lateral members 19 and 20 have their respective extremities 21—24 fixed to the casing 1. The first lateral member 19 and the four parallel members 7, 8, 13 and 14 cross at points 27—30. Similarly, the second lateral member 20 and the four parallel members cross at points 31—34. The lateral members 19 and 20 are fixed at each of the crossing points 27—34 to the four parallel members 7, 8, 13 and 14 by spot welding or the like. A rigid support for the electric fan motor 3 is thus provided.

The first parallel member 7 and the second parallel member 8, in the form of the invention being described, have arcuate central regions 36 and 37 generally defined between the first lateral member 19 and the second lateral member 20. The first arcuate central region 36 and the second arcuate central region 37 are adapted to generally conform to the peripheral configuration of the fan motor 3. The first arcuate region 36 has a deformed recess or semicircular eyelet 38 spaced from a second correspondingly deformed recess 39. The second arcuate region 37 has a similarly deformed recess or semicircular eyelet 40 spaced from a correspondingly deformed recess 41. In the present form of the invention being described, the deformed recesses or simicircular eyelets 38—41 open inwardly toward each other but such recesses may also be formed to open outwardly from each other without departing from the intended scope of the present invention. The fan motor 3 as shown has a plurality of radially extending lugs, such as shown at 45, which are adapted to receive suitable fastener means and retain the fan motor 3.

The four parallel members 7, 8, 13 and 14 and the two lateral members 19 and 20 provide the improved motor support of the present invention where in the form shown the motor 3 and the motor driven fan 5 are supported in a cantilever fashion by the improved fan guard and motor support. The fan guard and motor support also has a plurality of parallel members, such as shown at 47 and 48 that are fixed at their respective crossing points to the four parallel members to provide a guard to prevent the introduction of foreign articles or an individual's hand into the rapidly moving fan blades.

Referring now to FIG. 2, the casing 1 is shown having the improved fan guard and motor support of the present invention. One of the lateral members 19 is shown suitably deformed at desired regions to provide the necessary support and to accommodate the four parallel members 7, 8, 13 and 14 fixed thereto. The extremities 21 and 22 of the lateral member 19 are shown deformed to provide a larger contact area when fixed, by welding or the like, to the inner wall of the casing 1. The electric fan motor 3 is more clearly shown with the radially extending lugs, such as at 45, secured to the deformed recesses of the arcuate regions of the first parallel member 7 and the second parallel member 8. It may be seen by FIG. 2 that the individual radially extending lugs receive a suitable securing means, such as at 46, to support the fan motor 3 in a cantilever fashion from the fan guard and motor support of the present invention.

FIG. 3 more clearly shows, in an exploded view, a portion of the improved fan guard and motor support of the present invention with the radially extending lug 45 of the fan motor 3 having a suitable bore 49 therethrough. A threaded screw 50 is positioned through the bore 49 to sequentiallly engage and pass through first the lug 45 and then a resilient means 51 which in the form being decribed can be a grommet or bushing formed from rubber or the like with a central bore 52 adapted to receive the screw. The screw 50 then engages a washer 54, and lastly a threaded nut 55. The screw assembly thus formed is tightened upon the deformed recess 40 which receives the reduced diameter 53 of the grommet 51. The screw assembly provides a compressive force in an axial direction on the grommet or resilient means 51 to securely engage the deformed recess 40 and cooperate with the similarly formed screw assemblies of the remaining motor lugs to support the fan motor. The resilient means substantially isolate and dampen any motor vibration that would be transmitted by direct metal-to-metal contact to the casing of the fan assembly.

Thus, the improved fan guard and motor support of the present invention accomplishes with a minimum number of structural components a substantially rigid motor support for the motor driven fan while also adequately isolating the motor driven fan from direct metal-to-metal contact to reduce undesirable noise levels developed during operation. The new and improved fan guard and motor support of the present invention further provides an effective fan guard to prevent the entrance of foreign objects into the rapidly moving fan blades.

As will be evidenced from the foregoing description, certain aspects of the invention are not limited to the particular details of contruction illustrated. For example, the deformed recesses of the arcuate regions have been shown to open generally inwardly toward each other. It is contemplated that the deformed recesses may open generally outwardly from each other. It its further contemplated that the central regions need not be arcuate in shape but rather may conform as desired either to the peripheral configuration of a motor to be supported by the improved fan guard and motor support or to lie adjacent thereto. It is contemplated that other modifications and applications will occur to those skilled in the art. It is, therefore, intended that the appended claims shall cover such modifications and applications that do not depart from the true spirit and scope of the invention.

What I claim is:

1. An electric fan assembly having a combined fan guard and motor support comprising, a casing, four elongated rod-like members vertically arranged in parallel relation to each other to form the only vertical members of the support, said four parallel members having their extremities rigidly fixed directly to said casing, two elongated rod-like members arranged parallel to each other and lateral to said four parallel members, said two parallel members having their extremities rigidly fixed directly to said casing to form the only lateral members of the support attached to the casing, said four parallel members and said two parallel members being arranged in approximately the same plane and being rigidly fixed to each other at respective crossing points, the inner pair of said four parallel members having a central region positioned between said two parallel members, a motor driven fan, means for resiliently mounting the motor driven fan to said central region to provide the sole connecting means between the motor driven fan and the support, and fan guard means rigidly secured to said four parallel members.

2. An electric fan having a combined fan guard and motor supporting means comprising, a casing having a generally rectangular cross-section formed by a top wall, a bottom wall, and two side walls; four elongated rod-like members parallel to each other and including an inner pair of parallel members and an outer pair of parallel members, said four parallel members having their extremities rigidly fixed directly to the top and bottom walls of said casing to form the only vertical members of the support, one member of said outer pair of parallel members being positioned in close proximity to one of said side walls and the other member of said outer pair of members being positioned in close proximity to the other of side walls, said inner pair of parallel members being substantially inwardly spaced from said outer pair of parallel members, two elongated rod-like members arranged parallel to each other and lateral to said four parallel members, said two parallel members having their extremities rigidly fixed directly to said casing side walls to form the only lateral members of the support fixed to the casing, said four parallel members and said two parallel members being arranged in approximately the same plane and being fixed to each other at respective crossing points, said inner pair of parallel members having a central region positioned between said two parallel members, a motor driven fan, means attaching the motor to said central region to provide the sole connections between the motor and the support, and a plurality of elongated rod-like guard members arranged in parallel relation to said two parallel members, said guard members having a smaller cross-section than said parallel members and being fixed to said four parallel members at respective crossing points to form a guard grid.

3. An electric fan assembly having a combined fan guard and motor support comprising, a casing, four elongated, rod-like members parallel to each other having their extremities rigidly fixed directly to said casing, two elongated rod-like members arranged parallel to each other and lateral to said four parallel members, said two parallel members having their extremities rigidly fixed to said casing, the connections between the extremities of said members and the casing being the only supporting connections between said casing and said support, said four parallel members and said two parallel members being arranged in approximately the same plane and being rigidly fixed to each other at respective crossing points, a motor driven fan, the inner pair of said four parallel members having a central region defined by said two parallel members and adapted to conform to the exterior housing of the motor driving the fan, deformed recesses in said central regions, resilient mounting means cooperating with said recesses and the motor to provide the sole connecting means between the motor and the support, and a guard grid rigidly attached to said four parallel members.

References Cited in the file of this patent

UNITED STATES PATENTS

| | | |
|---|---|---|
| 1,715,669 | Nuttall | June 4, 1929 |
| 2,258,325 | Hess et al. | Oct. 7, 1941 |
| 2,516,184 | Christie | July 25, 1950 |
| 2,617,583 | Kemler | Nov. 11, 1952 |
| 2,867,377 | Lasko | Jan. 6, 1959 |
| 2,961,152 | Douglas et al. | Nov. 22, 1960 |